United States Patent
Jennings

(10) Patent No.: US 7,819,378 B2
(45) Date of Patent: Oct. 26, 2010

(54) FLOATING PLUG GATE VALVE

(75) Inventor: Charles E. Jennings, Houston, TX (US)

(73) Assignee: Vetco Gray Inc., Houston, TX (US)

( * ) Notice: Subject to any disclaimer, the term of this patent is extended or adjusted under 35 U.S.C. 154(b) by 486 days.

(21) Appl. No.: 11/926,624

(22) Filed: Oct. 29, 2007

(65) Prior Publication Data

US 2008/0099710 A1 May 1, 2008

Related U.S. Application Data

(60) Provisional application No. 60/855,182, filed on Oct. 30, 2006.

(51) Int. Cl.
*F16K 35/00* (2006.01)
(52) U.S. Cl. .................. 251/77; 251/175; 251/204; 251/327
(58) Field of Classification Search ............ 251/77, 251/203, 204, 212, 326, 327, 333, 175
See application file for complete search history.

(56) References Cited

U.S. PATENT DOCUMENTS

| | | | | |
|---|---|---|---|---|
| 1,261,895 A | * | 4/1918 | Bartholomew | 137/597 |
| 1,280,451 A | * | 10/1918 | Hagen | 251/158 |
| 2,750,962 A | * | 6/1956 | Kreitchman et al. | 137/625.48 |
| 3,768,774 A | * | 10/1973 | Baugh | 251/175 |
| 3,871,616 A | * | 3/1975 | Taylor | 251/175 |
| 4,013,090 A | * | 3/1977 | Taylor | 137/329.05 |
| 4,165,858 A | | 8/1979 | Thackery | |
| 4,179,099 A | | 12/1979 | Pierce, Jr. | |
| 4,291,862 A | | 9/1981 | Alvarez et al. | |
| 4,405,113 A | | 9/1983 | Erwin et al. | |
| 4,573,660 A | * | 3/1986 | Husted | 251/195 |
| 6,425,410 B1 | * | 7/2002 | Taylor | 137/70 |

FOREIGN PATENT DOCUMENTS

GB 2375382 A 11/2002
JP 63312573 A 12/1988

* cited by examiner

*Primary Examiner*—John K Fristoe, Jr.
*Assistant Examiner*—Marina Tietjen
(74) *Attorney, Agent, or Firm*—Bracewell & Giuliani

(57) ABSTRACT

A gate valve has a gate that moves in a gate cavity between a lower closed position and an upper open position. A seal member in the gate seals against a downstream seat ring when the gate is in the closed position. The seal member is moveable in upward and downward directions as well as upstream and downstream directions relative to the gate. The seal member is in an upper and downstream position relative to the gate while the gate is in the closed position. A cam member is carried by the gate for movement in unison and is in engagement with the seal member. The cam member moves the seal member to an upstream and downward position in response to initial movement of the gate from the closed position toward the open position.

20 Claims, 4 Drawing Sheets

FLOATING PLUG GATE VALVE

CROSS-REFERENCE TO RELATED APPLICATION

This application claims priority to provisional patent application 60/855,182, filed Oct. 30, 2006.

FIELD OF THE INVENTION

This invention relates in general to gate valves, and in particular to a gate valve having a feature for reducing wear on the sealing surfaces of the gate.

BACKGROUND OF THE INVENTION

A gate valve has a body with a flow passage extending through it. A gate cavity intersects the flow passage, and seat rings are located at the upstream and downstream points of intersection. An actuator, which may be mechanical, hydraulic or electrical, moves a gate within the cavity between open and closed positions. In the closed position, a seal surface on the gate contacts the downstream seat ring. The upstream pressure exerts a force pushing the seal surface into tight sealing engagement. The gate has an aperture through it next to the seal surface. When in the open position, the aperture registers with the flow passage.

When the operator begins to open the gate valve, the seal surface of the gate slides across the seat ring as the gate moves to the open position. The upstream pressure force continues to act on the gate until the aperture reaches the seat rings. If the upstream pressure force is high, a considerable friction force results even if the seal surface and the seat rings are smooth surfaces and lubricants are employed. This frictional force can damage the seal surfaces of the seat ring and gate.

SUMMARY

The gate valve has features to cause the seal surface of the gate to move away from the seat ring when the gate begins to open, rather than drag across the seat ring. The gate valve has a seal member mounted to the gate that seals against the downstream seat ring when the gate is in the closed position. A cam member is carried by the gate in cooperative engagement with the seal member. The cam member moves the seal member in an upstream direction in response to beginning movement of the gate from the closed position toward the open position. This movement pulls the seal member away from the seat ring upon initial movement of the gate.

In the preferred embodiment, the seal member moves in upstream and downstream directions relative to the gate. Also, the seal member is movable in closing and opening directions relative to the gate. The cam member is movable in unison with the gate and has a cam surface that engages a portion of the seal member so as to push the seal member in a direction that is between the closing direction and the upstream direction.

In the example shown, the seal member is a plug located within a plug hole extending through the gate from an upstream side to a downstream side, the plug having a downstream end that contacts and seals against the downstream seat ring. In the same example, the cam member is a key mounted to the gate for movement therewith, the key extending through a key hole in the plug that is transverse to the plug hole. The key hole is configured to allow the plug to move relative to the key in a downward and upstream direction and an upward and downstream direction. The key hole is configured to prevent the plug from moving relative to the key in an upward and upstream direction and in a downward and downstream direction.

DETAILED DESCRIPTION OF THE INVENTION

Figure 1:
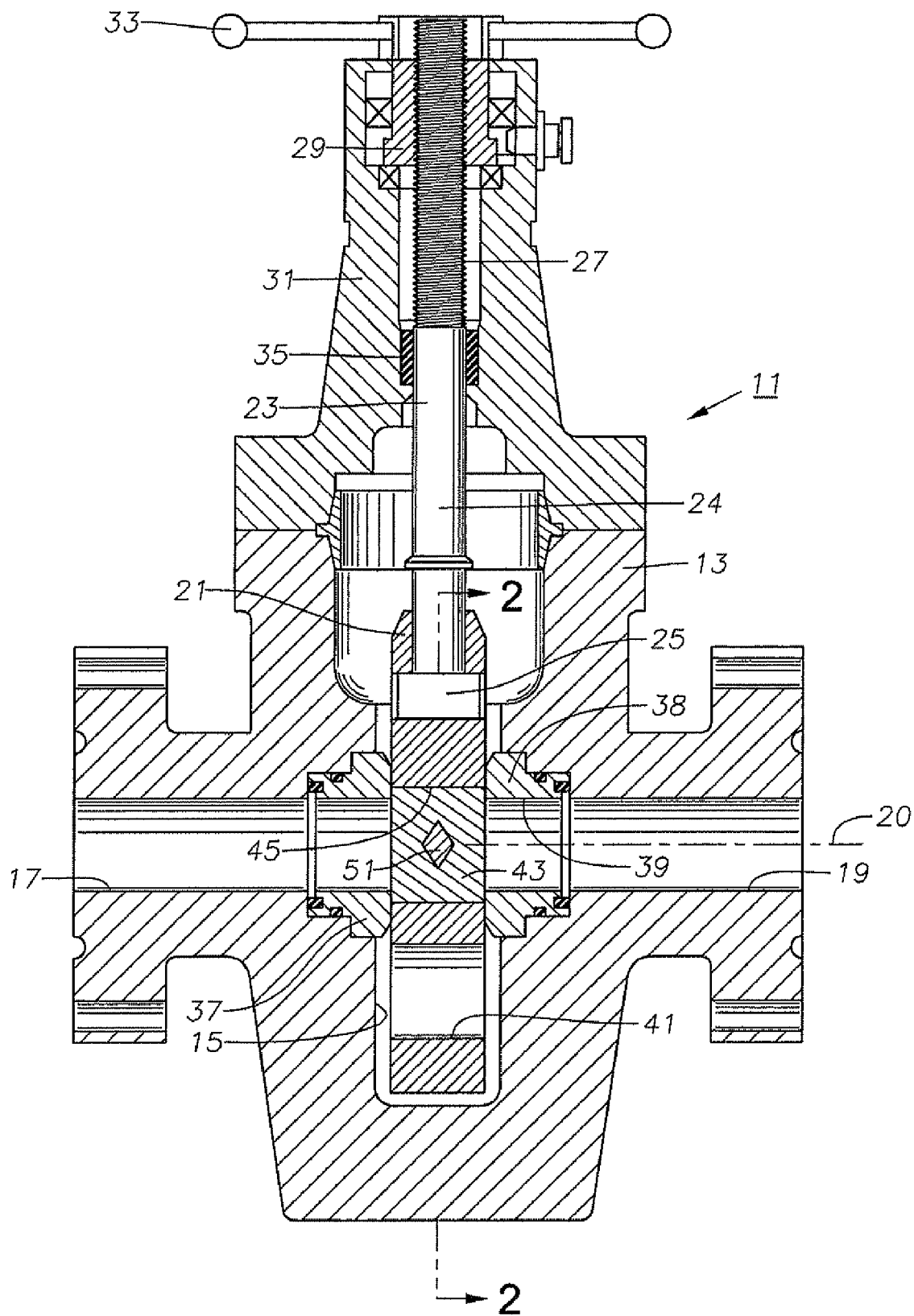
FIG. 1 is a sectional view of a gate valve constructed in accordance with this invention and shown in a closed position under pressure.

Referring to FIG. 1, valve 11 has a body 13 with a gate cavity 15 located therein. Flow line passages 17, 19, which extend through body 13, are coaxial with each other about an axis 20 and intersect gate cavity 15. A gate 21 is carried within cavity 15 for movement in a plane perpendicular to axis 20 of flow line passages 17, 19. Gate 21 is generally rectangular, having upstream and downstream flat sides.

In this embodiment, gate 21 is moved by a rising stem 23, wherein stem 23 does not rotate, rather it moves linearly outward from body 13 along stem axis 24 as gate 21 is being lifted. Alternately, gate 21 could have a threaded nut on its upper end and be moved by a rotating non-rising stem (not shown). Stem 23 has a T-member 25 on its lower end that fits within a receptacle at the upper end of gate 21 in this embodiment. Stem 23 has threads 27 on its upper end that engage a rotatable sleeve nut 29. Sleeve nut 29 is carried within a bonnet 31 mounted to the upper end of body 13. A hand wheel 33 is employed to rotate sleeve nut 29 relative to threads 27 to cause stem 23 to move linearly along its axis 24. Alternately, a hydraulic or electric actuator could be utilized to cause axial movement of stem 23. A stem seal 35 located in bonnet 31 seals around stem 23 and seals pressure within gate cavity 15.

A seat ring 37, 38 is mounted at the intersection of each flow passage 17, 19, respectively, with gate cavity 15. Seat rings 37, 38 have holes 39 therethrough and seal surfaces on their inward directed faces for sealing against the sides of gate 21. The distance between the seal surfaces of seat rings 37, 38 is slightly greater than the thickness of gate 21. Seat rings 37, 38 may be biased by springs toward each other.

In this embodiment, gate 21 is a single slab type, but it could be a split type, which would have two separate halves. Gate 21 has a flow passage or aperture 41 that registers with flow passages 17, 19 and holes 39 in seat rings 37, 38 when the gate is in a fully open position. The inner diameter of gate flow passage 41 is typically the same as holes 39 in seat rings 37, 38 and flow passages 17, 19.

Figure 3:
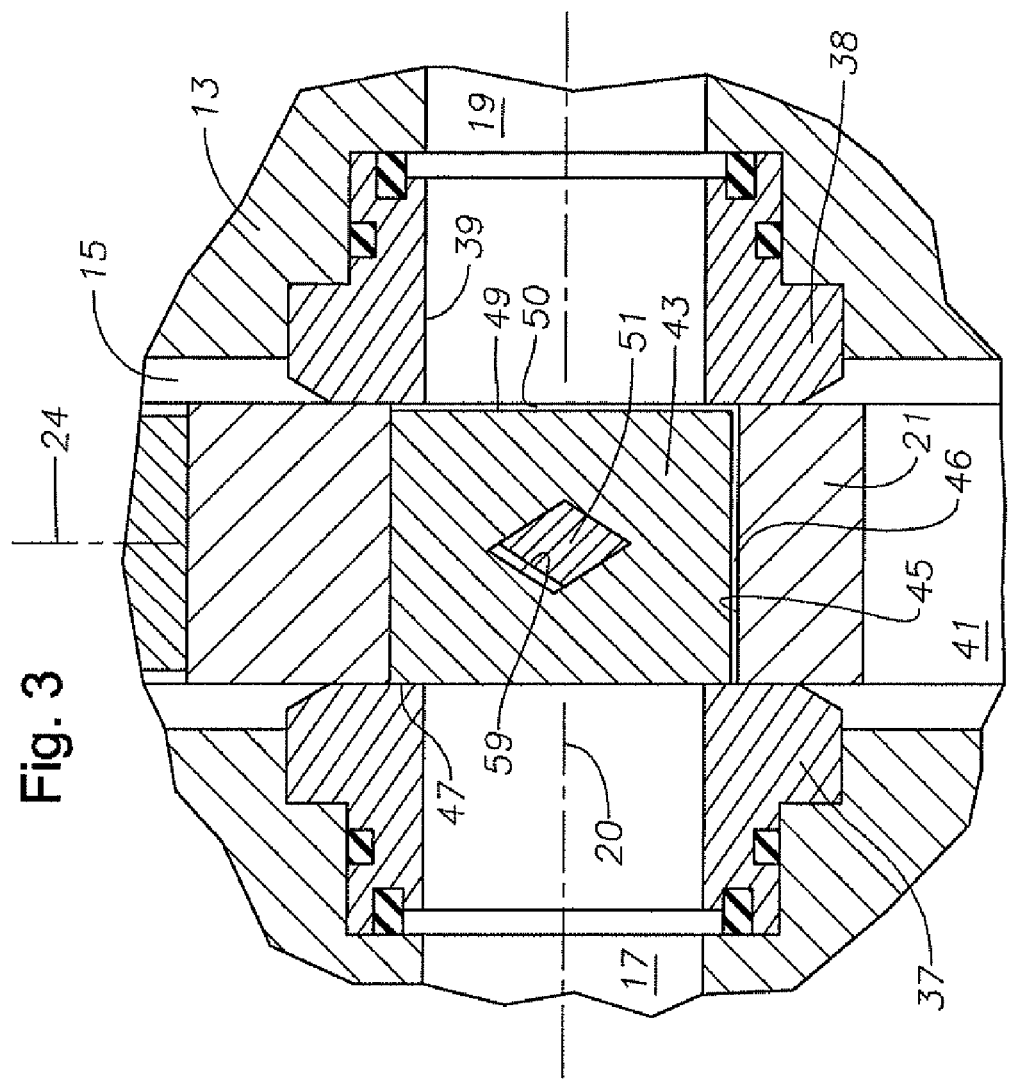
FIG. 3 is an enlarged sectional view of a portion of the gate as shown in FIG. 1, with the gate closed and under pressure.

Gate 21 has a seal member, which in this example, comprises a plug 43 located in a transverse bore 45 that is parallel to and located above gate flow passage 41. The terms "upward", "downward", "above", and "below" are used only for convenience because gate valve 11 may be installed in various positions, other than with stem 25 pointing upward. Seal plug 43 is preferably a cylindrical member with an outer diameter that is larger than the inner diameter of gate valve flow passage 41 and also larger than the inner diameter of holes 39 in seat rings 37, 38. Seal plug 43 could have shapes other than cylindrical. Seal plug 43 has flat seal ends 47, 49 located in parallel planes. The distance between ends 47, 49 may be slightly less than the width between the upstream and downstream sides of gate 21. Also, the distance between ends 47, 49 is less than the distance between seat rings 37, 38, resulting in a slight gap 50 between upstream plug end 49 and seat ring 38 when gate 21 is closed and under pressure from flow passage 19, as shown in FIG. 3. When not under pressure, seal plug 43 can slide freely back and forth in bore 45 along its axis relative to gate 21.

Seal plug 43 is also capable of moving in upward and downward directions relative to gate 21. If seal plug 43 is cylindrical, as shown, the outer diameter of seal plug 43 is made slightly less than the inner diameter of plug bore 45, allowing slight upward and downward movement of seal plug 43 relative to gate 21 in a direction perpendicular to axis 24 of stem 23. Gap 46 between the outer diameter of seal plug 43 and the inner diameter of plug bore 45 is shown on the upper side of seal plug 43 in FIG. 4. When seal plug 43 moves upward slightly relative to gate 21, gap 46 exists on the lower side of seal plug 43, as shown in FIG. 3, rather than the upper side.

A cam member 51 is employed to cause seal plug end 47 to pull away from downstream seat ring 37 when gate 21 begins to move from its closed position. In this embodiment, cam member 51 comprises a key 51 that extends through mating gate key holes 53 in gate valve 21. In this example, key hole 53 passes through the intersection of flowline axis 20 and stem axis 24. Key 51 also extends through a plug key hole or slot 55 in seal plug 43, as shown also in FIG. 2. Key 51 has a length greater than the outer diameter of seal plug 43 and approximately equal to the width of gate 21 measured from one side edge to the other side edge. Key 51 has an axis that is perpendicular to the axis of seal plug 43 as well as to the stem axis 24. Key 51 moves in unison with gate 21, and seal plug 43 moves slightly relative to key 51 and gate 21 when gate 21 begins to move from its closed position.

Figure 5:
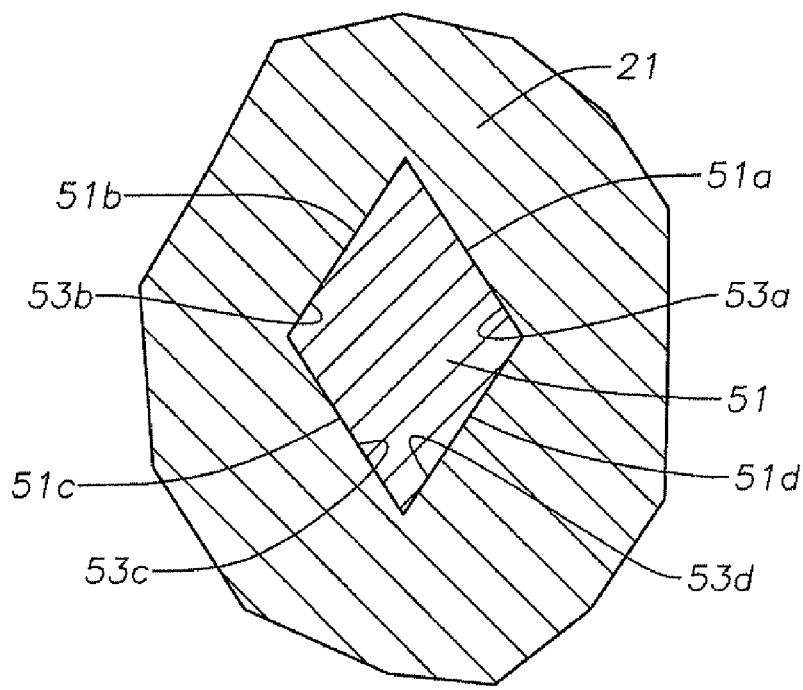
FIG. 5 is a sectional view of a portion of the gate of the gate valve of FIG. 1, taken along the line 5-5 of FIG. 2.

In this embodiment, key 51 has a generally diamond-shaped configuration, although other configurations are feasible. Referring to FIG. 5, key 51 has flat flanks or sides 51a, 51b, 51c and 51d. Sides 51a and 51c are parallel to each other, and sides 51b and 51d are parallel to each other. Side 51a faces generally upward and upstream; side 51c faces generally downward and downstream. Side 51b faces generally upward and downstream; and side 51d faces generally downward and upstream. In this example, the width of key 51 is less than its height as measured in the cross-sectional view of FIG. 5. The included angles between sides 51a and 51d and between sides 51b and 51c are the same and obtuse. Similarly, the included angles between sides 51a and 51b and between sides 51c and 51d are the same and acute. Gate valve key hole 53 has mating sides 53a, 53b, 53c and 53d that tightly engage key sides 51a, 51b, 51c and 51d. Preferably, key 51 is substantially immovable relative to gate 21 because of the tight engagement with gate valve key hole 53.

Figure 2:
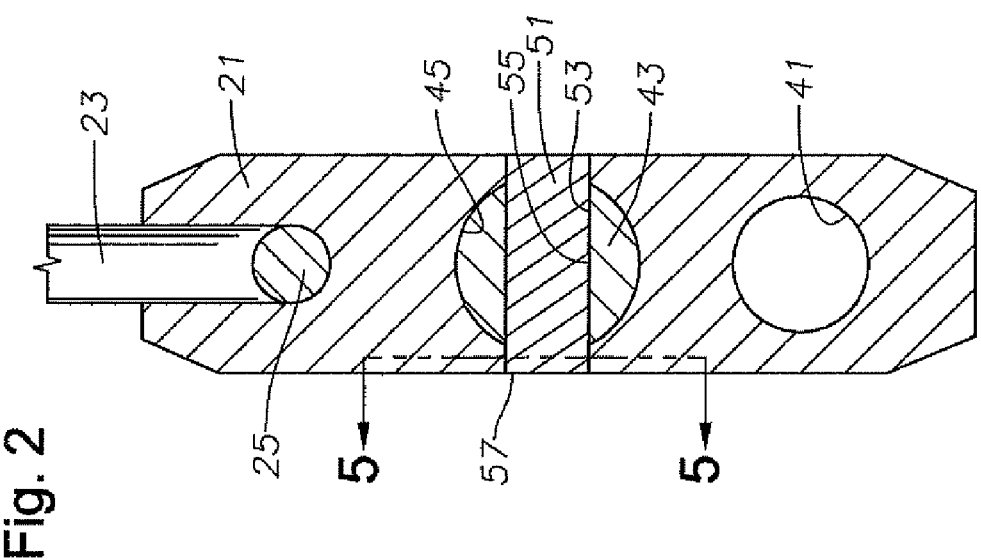
FIG. 2 is a sectional view of the gate of the gate valve of FIG. 1, taken along the line 2-2 of FIG. 1 and shown removed from the gate valve body.
Figure 4:
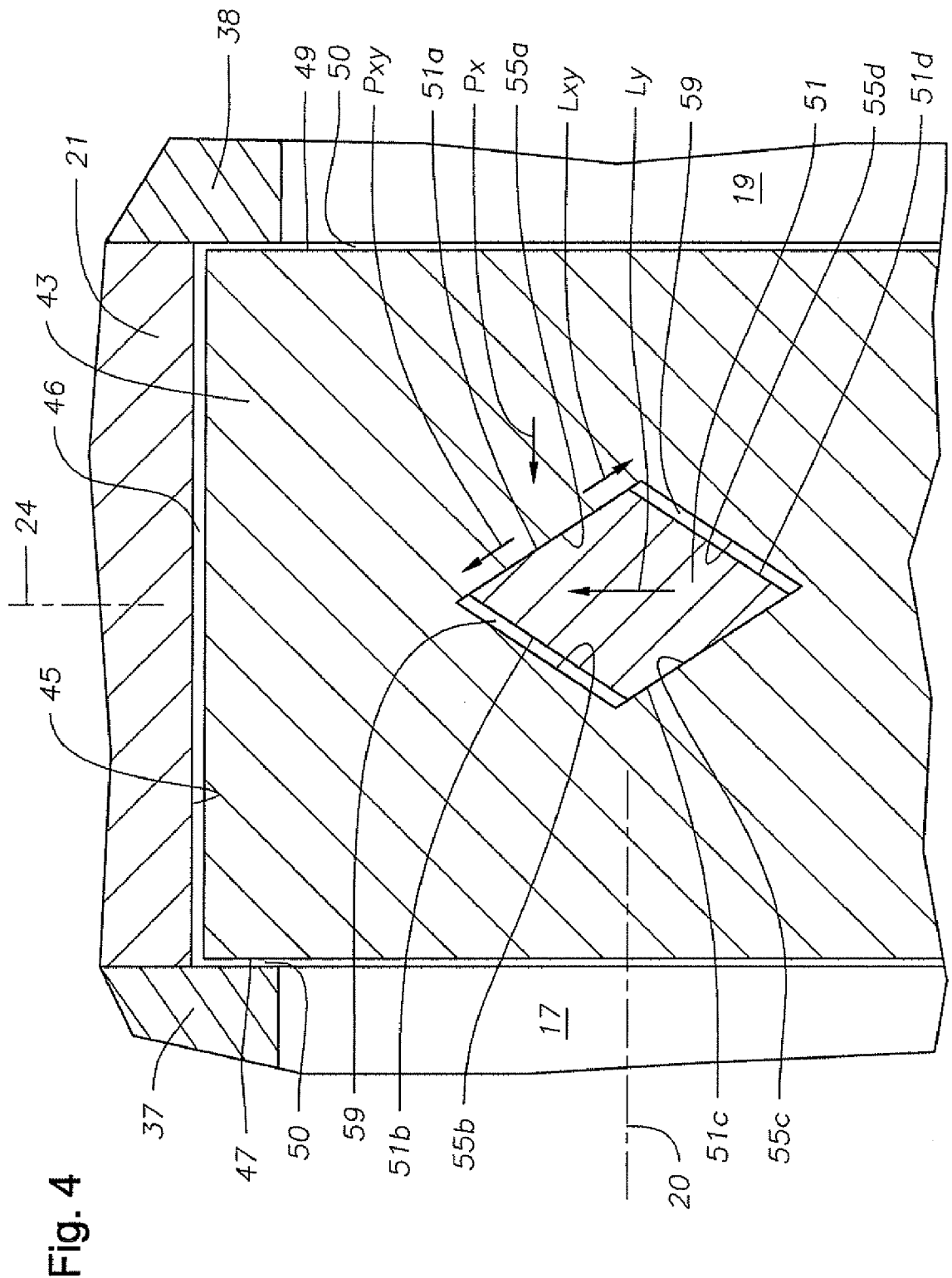
FIG. 4 is a further enlarged view of a portion of the gate as shown in FIG. 3, but with the gate closed and under no pressure.

Referring to FIG. 4, plug key hole 55 differs in dimensions from key 51 so that key 51 can move slightly relative to seal plug 43. In this example, plug key hole 55 has a diamond-shaped configuration with sides 55a, 55b, 55c and 55d. Preferably parallel plug key hole sides 55a and 55c are substantially the same distance apart as key parallel sides 51a and 51c. However, the distance between plug key hole sides 55b and 55d is greater than the distance between the key sides 55b and 55d. This results in a gap 59, which could be either on key side 55b, key side 55d or partially on both. As shown in FIG. 2, key 51 has ends 57 that are flush with side edges of gate 21.

Figure 6:
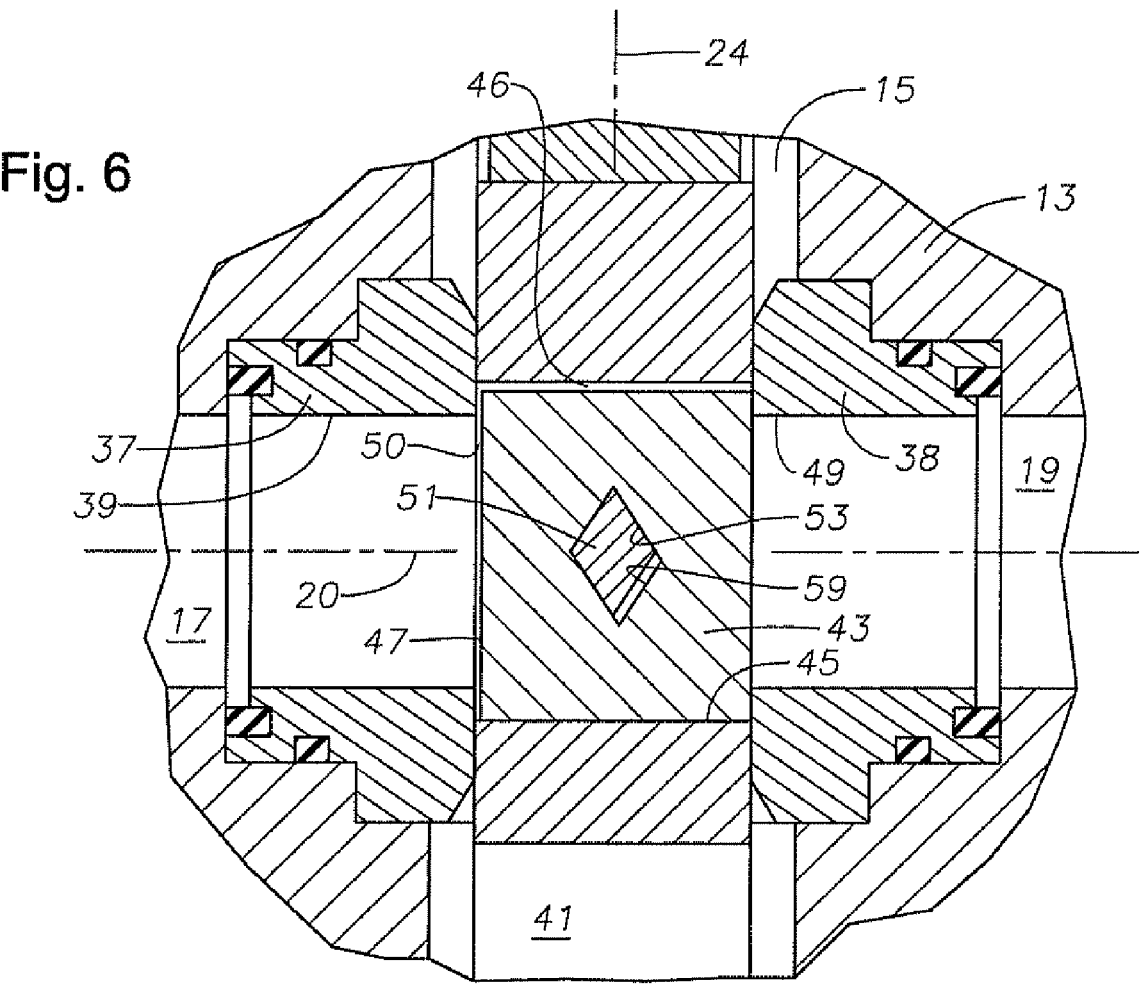
FIG. 6 is a sectional view similar to FIG. 3, but showing the gate being lifted from the closed position.

FIG. 4 illustrates an idealized neutral position when gate 21 is in a closed position but no flow line pressure exists, and in this position, part of gap 59 is shown between sides 51d and 55d and part of gap 59 is shown between sides 55b and 51b. As will be explained subsequently, while in the closed position with pressure in flow passage 19, as shown in FIG. 3, gap 59 is located only between downstream sides 51b and 55b, and upstream sides 51d and 55d are touching each other. When moving from the closed position in FIG. 3 to an open position, as illustrated in FIG. 6, key gap 59 will exist only on the upstream side, between sides 51d and 55d, and downstream sides 51b and 55b will be touching each other. In each of these instances, when only a single gap 59 exists, it will be equal in width to the two gaps 59 shown in FIG. 4.

In operation, FIG. 4 illustrates a possible position for seal plug 43 while gate 21 is in the fully closed position without any pressure in passages 17, 19. A slight plug end gap 50 may exist between seal plug end 47 and seat ring 37, A plug end gap 50 may also exist between seal plug end 49 and seat ring 38. Plug end gaps 50 would not likely be identical, but they could be approximately the same. Plug diameter gap 46 would normally be located between the outer diameter on the upper side of seal plug 43 and plug bore 45. Because of the weight of seal plug 43, its outer diameter would typically be contacting plug bore 45 on the lower side. Typically key gaps 59 would exist both between downstream sides 51b and 55b as well as upstream sides 51d and 55d, although key gaps 59 would not likely be exactly equal.

With flow line pressure applied to an upstream side, which is considered to be flow passage 19 in this example, a force Px (FIG. 4) parallel to axis 20 occurs. Force Px acts on plug upstream end 49 and tends push seal plug 43 downstream to the left. While the entire gate 21 might shift slightly to the left, plug 43 is able to move farther to the left than gate 21 because it is able to move relative to key 51. As indicated by the vector arrow Pxy, the movement of plug 43 relative to gate 21 is upward and to the left or downstream. This upward and downstream movement will cause plug end gap 50 on the downstream end 47 to completely close up and plug end gap 50 on the upstream end 49 to increase. Also, plug diameter gap 46 will decrease on the upper end and increase on the lower end because of the upward component of the movement of plug 43 relative to gate 21. The closed position with pressure in flow passage 19 is illustrated in FIG. 3. A tight seal is formed between the outer margin of downstream plug end 47 and its mating downstream seat ring 37. Plug end gap 50 is now entirely on the upstream side between plug upstream end 49 and its upstream seat ring 38. The force exerted by the pressure in flow passage 19 maintains plug 43 in the sealed position shown in FIG. 3.

In the prior art, when the operator wishes to move a gate from a closed position under high pressure to an open position, normally a high frictional force between the gate and the downstream seat ring would have to be overcome. In this gate valve, a high frictional force between the outer margin of seal plug end 47 and seat ring 37 does exist because of the sealing engagement and high pressure. However, as the operator causes gate 21 to begin moving upward, gate 21 will initially move upward a slight distance relative to seal plug 43 because of outer diameter gap 46 on the lower side and because of key gap 59 on the upper downstream side of key 51. During the initial upward movement of gate 21, gate 21 does not touch downstream seat ring 37. As gate 21 begins to move upward, key 51 also begins to move upward in unison, as indicated by the arrow Ly in FIG. 4, which creates an immediate relative movement between key 51 and plug 43 as indicated by the arrow Lxy. The direction of the vector Lxy is both downward and in an upstream direction relative to key 51. The close contact between upstream key side 51a and key hole 51b results in plug 43 moving upward and upstream relative to downstream seat ring 37. Gap 59 between upper sides 51b, 55b begins to close and gap 59 begins to appear now between the lower upstream sides 51d and 55d. The movement of seal plug 43 upstream and upward slightly relative to gate 21 occurs as the same time gate 21 begins moving upward, thus immediately breaks the sealing contact between seal plug end 47 and seat ring 37. Plug end gap 50 will then appear on the downstream side between seal plug end 47 and seat ring 37, and plug end gap 50 on the upstream side between seal plug end 49 and seat ring 38 will decrease. This position is illustrated in FIG. 6.

As mentioned, because of the initial upstream component of the movement of seal plug 43 relative to seat ring 37 when gate 21 begins moving upward, the sealing engagement breaks quickly between the downstream seal plug end 47 and downstream seat ring 37. With the sealing engagement breaking, plug end gap 50 immediately appears between downstream plug end 47 and seat ring 37. Thus as gate 21 continues to move upward, seal plug end 47 does not drag across the seal surface of seat ring 37.

The gate valve described herein has significant advantages. The plug and key arrangement causes the seal surface of the gate to immediately pull away from the downstream seat ring when the gate begins to open. This feature reduces damage to the seal surfaces that might otherwise occur in high pressure applications.

While the gate valve has been shown in only one of its forms, it should be apparent to those skilled in the art that it is not so limited but is susceptible to various changes without detracting from its advantages.

The invention claimed is:

1. A gate valve, comprising:
   a body with a flow passage intersected by a gate cavity;
   a first seat ring at an intersection of the flow passage with the gate cavity;
   a second seat ring at an intersection of the flow passage with the gate cavity on an opposite side of the gate cavity from the first seat ring;
   a gate that is movable in the gate cavity between a closed position and an open position;
   a seal member in the gate having a first end that seals against the first seat ring when the gate is in the closed position and the first seat ring is downstream of the second seat ring relative to flow through the flow passage, the seal member having a second end that seals against the second seat ring when the gate is in the closed position and the second seat ring is downstream of the first seat ring relative to flow through the flow passage; and
   a cam member carried by the gate and in cooperative engagement with the seal member for moving the seal member in an upstream direction relative to the gate in response to beginning movement of the gate from the closed position toward the open position regardless whether the seal member is sealing against the first seat ring or the second seat ring.

2. The gate valve according to claim 1, further comprising:
   a stem coupled to the gate for moving the gate between the open and closed positions, the stem having a stem axis; and
   the gate being substantially centered on the stem axis both in the open position and the closed position.

3. The gate valve according to claim 1, wherein the seal member is movable in closing and opening directions relative to the gate.

4. The gate valve according to claim 1, wherein the cam member is movable in unison with the gate.

5. The gate valve according to claim 1, wherein the cam member has a cam surface that engages a portion of the seal member so as to push the seal member in a direction that is between the closing direction and the upstream direction.

6. The gate valve according to claim 1, wherein the seal member comprises:
   a plug located within a plug hole extending through the gate from an upstream side to a downstream side.

7. The gate valve according to claim 6, wherein the cam member comprises:
   a key mounted to the gate for movement therewith, the key extending through a key hole in the plug that is transverse to the plug hole.

8. The gate valve according to claim 7, wherein:
   the gate moves in an upward direction when opening and a downward direction when closing;
   the plug is movable in the plug hole in the upward and downward directions as well as in the upstream and downstream directions;
   the key hole is configured to allow the plug to move relative to the key in a downward and upstream direction and an upward and downstream direction; and
   the key hole is configured to prevent the plug from moving relative to the key in an upward and upstream direction and in a downward and downstream direction.

9. A gate valve, comprising:
   a body with a flow passage intersected by a gate cavity;
   a downstream seat ring at an intersection of the flow passage with the gate cavity;
   a gate that is movable in the gate cavity between a lower closed position and an upper open position;
   a seal member in the gate that seals against the downstream seat ring when the gate is in the closed position, the seal member being moveable in upward and downward directions as well as upstream and downstream directions relative to the gate, the seal member being in an upper and downstream position relative to the gate while the gate is in the closed position;
   a cam member carried by the gate for movement in unison therewith and in engagement with the seal member, the cam member moving the seal member to an upstream and downward position relative to the gate in response to initial movement of the gate from the closed position toward the open position; and wherein,
   the movement of the seal member caused by the cam member begins simultaneously with the initial movement of the gate.

10. The gate valve according to claim 9, wherein:
   the seal member is located within a seal member hole in the gate valve; and
   the cam member extends through a slot provided in the seal member, the slot extending perpendicular to an axis of the seal member hole.

11. The gate valve according to claim 9, wherein:
   the seal member is located within a seal member hole in the gate valve;
   the cam member extends through a slot in the seal member, and comprises:
   an upward and upstream flank that faces upward and upstream and is in contact with the seal member while the gate is in the closed position;

an upward and downstream flank that faces upward and downstream and is spaced from the seal member by a gap while the gate is in the closed position and contacts the seal member while the gate is moving toward and in the open position.

12. The gate valve according to claim 9, wherein the cam member comprises:
a key that inserts into a key hole formed in the seal member; wherein
the key has a triangular shape in cross-section, having first and second flanks that are parallel each other and third and fourth flanks that are parallel each other, the first flank facing upward and upstream, the second flank facing downward and downstream, the third flank facing downward and upstream, and the fourth flank facing upward and downstream;
the key hole has a triangular shape with first and second sides that are parallel to each other and third and fourth sides that are parallel to each other;
a distance between the first and second sides is substantially the same as the distance between the first and second flanks, so that the first and second sides simultaneously engage the first and second flanks; and
a distance between the third and fourth sides is greater than a distance between the third and fourth flanks, so that a gap exists between the third side and the third flanks while the fourth side is engaging the fourth flank, and a gap exists between the fourth side and the fourth flank while the third side is engaging the third flank.

13. The gate valve according to claim 9, further comprising:
a stem coupled to the gate for moving the gate between the open and closed positions, the stem having a stem axis; and
the gate being substantially centered on the stem axis both in the open position and the closed position.

14. A gate valve, comprising:
a body with a flow passage intersected by a gate cavity;
a downstream seat ring at an intersection of the flow passage with the gate cavity;
a gate that is movable in the gate cavity between a closed position and an open position;
a plug movably mounted in a plug hole in the gate and having a downstream end dimensioned for sealing contact with the downstream seat ring when the gate is in the closed position; and
a key mounted in the gate for movement therewith and extending through a key hole in the plug that is transverse to the plug hole, the key hole and the plug hole being dimensioned such that when the gate starts to move from the closed position, the key shifts in the key hole, which causes the plug to shift in the plug hole in an upstream direction to break contact with the seat ring.

15. The gate valve according to claim 14, wherein the key is movable in the key hole in directions transverse to an axis of the key.

16. The gate valve according to claim 14, wherein the downstream end of the plug protrudes past the gate while in the closed position.

17. The gate valve according to claim 14, wherein:
the opening movement of the gate is in a first direction; and
the plug hole is larger than the plug so that when beginning to move from the closed position, the gate is movable a short distance in the first direction relative to the plug.

18. The gate valve according to claim 14, wherein:
the opening movement of the gate is in a first direction and the closing movement of the gate is in a second direction;
the key hole is larger than the key in a direction that is between the upstream and the first directions; and
the key hole snuggly receives the key in a direction that is between the downstream and the first direction, so that the initial opening movement in the first direction of the gate pushes the plug in a direction between the downstream and the second directions relative to the gate.

19. The gate valve according to claim 14, wherein:
the key has a triangular shape in cross-section, having first and second flanks that are parallel each other and third and fourth flanks that are parallel each other, the first flank facing upward and upstream, the second flank facing downward and downstream, the third flank facing downward and upstream, and the fourth flank facing upward and downstream;
the key hole has a triangular shape with first and second sides that are parallel to each other and third and fourth sides that are parallel to each other;
a distance between the first and second sides is substantially the same as the distance between the first and second flanks, so that the first and second sides simultaneously engage the first and second flanks; and
a distance between the third and fourth sides is greater than a distance between the third and fourth flanks, so that a gap exists between the third side and the third flanks while the fourth side is engaging the fourth flank, and a gap exists between the fourth side and the fourth flank while the third side is engaging the third flank.

20. The gate valve according to claim 19, wherein
the plug has a dimension between its lower side and upper side that is less than the dimension of the hole between its upper side and lower side, so as to allow upward and downward movement of the plug relative to the gate.

* * * * *